US007644277B2

(12) United States Patent
Nito

(10) Patent No.: US 7,644,277 B2
(45) Date of Patent: Jan. 5, 2010

(54) ELECTRONIC KEY INFORMATION SYSTEM

(75) Inventor: Hiroaki Nito, Tokyo (JP)

(73) Assignee: NEC Corporation, Tokyo (JP)

( * ) Notice: Subject to any disclaimer, the term of this patent is extended or adjusted under 35 U.S.C. 154(b) by 937 days.

(21) Appl. No.: 10/878,631

(22) Filed: Jun. 29, 2004

(65) Prior Publication Data

US 2005/0047599 A1 Mar. 3, 2005

(30) Foreign Application Priority Data

Jun. 30, 2003 (JP) ............................ 2003-186146

(51) Int. Cl.
*G06F 9/00* (2006.01)

(52) U.S. Cl. ...................... 713/171; 713/172; 713/185; 713/189; 713/193

(58) Field of Classification Search ................ 713/171, 713/172, 185, 189, 193
See application file for complete search history.

(56) References Cited

U.S. PATENT DOCUMENTS

2002/0180582 A1 12/2002 Nielsen
2003/0025589 A1 2/2003 Koike

FOREIGN PATENT DOCUMENTS

JP 07-063939 3/1995
JP 2000-3457747 12/2000
JP 2002-004661 A 1/2002
JP 2002-081242 A 3/2002
JP 2002-083087 A 3/2002
JP 2003-090155 A 3/2003

*Primary Examiner*—Thomas R. Peeso
(74) *Attorney, Agent, or Firm*—Foley & Lardner LLP

(57) ABSTRACT

In an authentication apparatus 300, so as to confirm whether a user is legitimate in supplying key information to a resource 500, discernment information for identifying the user is caused to be input, and only in a case where this discernment information coincided with the stored discernment information of the user, the key information is supplied to the resource. Also, in causing the authentication apparatus 300 to register the discernment information of the user, the discernment information is caused to be input, this discernment information is collated with the discernment information registered in a key information management center 200, and in a case where it coincided, the authentication apparatus 300 is caused to register the discernment information. Further, in having caused the authentication apparatus 300 to register the discernment information, this legitimate discernment information is transmitted to the key information management center 200, the key information caused to correspond to the legitimate discernment information is transmitted to the authentication apparatus 300 from the key information management center 200, and the authentication apparatus 300 is caused to store the key information.

26 Claims, 9 Drawing Sheets

ELECTRONIC KEY INFORMATION SYSTEM

BACKGROUND OF THE INVENTION

The present invention relates to a technology of an electronic key information system, and more particularly to a technology of an electronic key information system for laying restrictions on utilization by means of electronic key information so as to limit utilization of a certain resource to a specific person.

In recent years, so as to avoid a security decline that originates in duplicating a mechanical key easily, there is a movement of computerizing a key in various fields. Introduction etc. of an immobilizer into a car is a good example. The immobilizer of the car has a mechanism of permitting the car to start, by authenticating key information stored in an IC chip embedded in the key by an ECU (Electronic Control Unit) of the car. This allows the effect to be obtained for preventing the car from being stolen by means of a physically duplicated key, which occurred on an earlier occasion.

Also, is conventionally known the electronic key information system of, at the moment that a portable key member having individual discernment information (electronic key information) written was lost, executing update, delete, addition, registration, etc. of the discernment information (electronic key information) (for example, JP-P2002-004661A (page 3), which is hereinafter referred to as a patent document 1).

In this technology, for example, each member of a family possesses the portable key member (a radio wave key, a remote control key, a non-contact type card, a contact type key, an IC card key, etc.) having kinds of the discernment information written, each of which differ from the other.

And, in a case where the portable key member that one member of the family possessed was lost, stolen, etc., a maintenance reader provided in a controller is caused to read an arbitrary one of the remaining portable key members. The discernment information (electronic key information) that the maintenance reader was caused to read is collated with discernment information registered to a memory section of the controller, it is determined that the remaining portable key member is legitimate in case where both kinds of information coincided, and modifications such as the update, the delete, the addition, and the registration are made for the discernment information pre-registered in the storage section.

Nevertheless, a first problem of the conventional electronic key information system employing the key information that the above-mentioned IC chip stored is to produce no effect upon stealing the key itself having the IC chip embedded totally. The reason is that even a user, who is not a legitimate user, can utilize the key because user identification is not required in utilizing the key.

Also, a second problem of the conventional electronic key information system is that it is difficult to insure a security in distributing the key having the IC chip embedded. The reason is that in a case of distributing the key by a request by the legitimate user, a confirmation has to be made as to whether a partner is a legitimate user in delivering the key; however its mechanism was not established.

Further, a third problem of the conventional electronic key information system is that it takes much time and labor to prepare the legitimately-available key that becomes a substitute for the lost key at the time that the key having the IC chip embedded was lost. The reason is that it is practically impossible to duplicate the computerized key even though the actual thing is kept at hand, and even the legitimate user is not able to manufacture a duplicate key with ease, differently from the mechanical key. Also, the reason is that it also takes much time to re-issue the key with a legitimate procedure as compared with a case of the mechanical key.

On the other hand, in the conventional electronic key information system described in the patent document 1, the unique discernment information that the portable key member has individually is assumed to be an object of identification, and in a case where the portable key member was lost, the discernment information that each has was lost together therewith, whereby so as to continue to utilize the thing that is an object of control, it becomes necessary to register the discernment information of a new portable key member to the controller.

Also, in the conventional electronic key information system described in the patent document 1, an identification of the user was not completely made with regard to use of the portable key member, whereby the problem existed that even the portable key member acquired unjustly resulted in being utilized unless its legitimate owner became aware of a loss of the portable key member, and erased the registration to the controller.

DISCLOSURE OF THE INVENTION

The present invention has been accomplished in consideration of the above-mentioned points, and an objective thereof is to provide a technology of an electronic key information system capable of insuring a higher security as compared with the conventional one.

Also, another object of the present invention is to provide a technology of an electronic key information system capable of continuing utilization of a resource safely and yet quickly, by obtaining a new authentication apparatus also at the moment that the authentication apparatus was lost, or disappeared.

A first invention for accomplishing the above-mentioned objectives, which is an electronic key information system for supplying electronic key information from an authentication apparatus that a user possesses to a resource that is an appliance/apparatus requiring authentication of said user, and for, only when the above key information is legitimate, making the above resource available, is characterized in:

having a key information management center for managing said key information in a concentrated manner that comprises: an information management apparatus for pre-storing said discernment information of said user and said key information of said resource correspondingly; an interface apparatus for making communication with said authentication apparatus; and a user authentication apparatus for registering said discernment information of said user, and a communication apparatus for controlling communication between said key information management center and said authentication apparatus;

that said authentication apparatus has:

authentication apparatus registration means for transmitting said discernment information of said user, which was input, to said key information management center via said communication apparatus, and for, when the authentication result that the above discernment information coincided with discernment information stored in said user authentication apparatus was transmitted and received from said key information management center via said communication apparatus, registering its discernment information; and key information acquisition means for transmitting the discernment information of the user registered to said authentication apparatus registration means to said key information management center via said communication apparatus, and for, when said key information stored in said information management apparatus was transmitted and received responding to the received discernment information via said communication apparatus from the above key information management center that received the above discernment information, storing its received key information; and that said authentication apparatus supplies said key information stored in said key information storage means to said resource, and utilizes the above resource.

A second invention for accomplishing the above-mentioned objectives is characterized in that when the discernment information of the user input into said authentication apparatus can be specified by the discernment information of the user registered to said authentication apparatus registration means, said authentication apparatus registration means perform a key information acquisition operation by said key information acquisition means in the above-mentioned first invention.

A third invention for accomplishing the above-mentioned objective is characterized in that when said discernment information of said user input into said authentication apparatus can be specified by the discernment information of the user registered to said authentication apparatus registration means, said authentication apparatus transmits the key information stored by said key information acquisition means to said resource in the above-mentioned first invention.

A fourth invention for accomplishing the above-mentioned objectives is characterized in that said authentication apparatus further has time limit management means for monitoring a time limit of validity of said received key information stored by said key information acquisition means, and for, when the above time of validity elapsed, causing said key information acquisition means to acquire said key information again from said key information management center in the above-mentioned first invention.

A fifth invention for accomplishing the above-mentioned objectives is characterized in that said resource has verification means for, when said key information transmitted from said authentication apparatus was received, verifying the above received key information, and that only when the key information was correctly verified by the above verification means, utilizing the above resource by said authentication apparatus is enabled in the above-mentioned first invention.

A sixth invention for accomplishing the above-mentioned objectives is characterized in that said discernment information is comprised of authentication information specific to a user and ID information in the above-mentioned first invention.

A seventh invention for accomplishing the above-mentioned objectives is characterized in that said authentication information is fingerprint information in the above-mentioned sixth invention.

An eighth invention for accomplishing the above-mentioned objectives, which is an electronic key information system, is characterized in having:

a management apparatus in which discernment information of a user of a resource is stored, said management apparatus collating the discernment information of the user to be transmitted with said stored discernment information to transmit a collation result; and an authentication apparatus having: discernment information storage means for transmitting the discernment information of the user that was input to said management apparatus, and for, in a case where the result that said discernment information of said user that was input coincided with the discernment information of the user stored in said management apparatus coincided was obtained, storing said discernment information of said user that was input; and discernment information collation means for collating the discernment information of the user that was input in utilizing the resource with the discernment information of the user stored in said discernment information storage means and, for, in a case where it coincided, transmitting the stored key information to said resource.

A ninth invention for accomplishing the above-mentioned objectives is characterized in that, in the above-mentioned eighth invention:

said authentication apparatus has key information acquisition means for collating the discernment information of the user that was input with the discernment information of the user stored in said discernment information storage means, for, in a case where it coincided, transmitting said discernment information to said management apparatus, and for storing the key information to be transmitted from said management apparatus responding hereto; and said management apparatus has means in which the discernment information of the user of the resource and the key information of said resource are stored correspondingly, said means retrieving the key information caused to correspond to said discernment information to transmit this key information to said authentication apparatus responding to the discernment information of the user to be transmitted from said authentication apparatus.

A tenth invention for accomplishing the above-mentioned objectives is characterized in that said discernment information is one of authentication information specific to a user and ID information, or authentication information specific to a user and ID information in the above-mentioned eighth invention.

An eleventh invention for accomplishing the above-mentioned objectives is characterized in that said authentication apparatus has means for monitoring a time limit of validity of the said stored key information, and for, when the time limit of validity elapsed, causing said key information acquisition means to perform an acquisition process of new key information in the above-mentioned eighth invention.

A twelfth invention for accomplishing the above-mentioned objectives, which is an authentication apparatus for supplying electronic key information to a resource, and for, when said key information is legitimate, making said resource available, is characterized in having:

a memory having discernment information for identifying a user and key information to be supplied to a resource stored;

input means into which the discernment information of the user is input; and discernment information collation means for collating the discernment information input from said input means with the discernment information of the user stored in said memory, and for, in a case where it coincided, transmitting the stored key information to said resource.

A thirteenth invention for accomplishing the above-mentioned objectives is characterized in, in the above-mentioned twelfth invention, having:

means for transmitting the discernment information input from said input means to a management apparatus for managing the discernment information of the user; and discernment information storage means for, in a case the result that said discernment information input from said management apparatus coincided with the discernment information of the user stored in said management apparatus coincided was obtained, for causing said memory to store said discernment information that was input.

A fourteenth invention for accomplishing the above-mentioned objectives is characterized in, in the above-mentioned twelfth invention, having:

means for collating the discernment information input from said input means with the discernment information of the user stored in said memory, and for, in a case where it coincided, transmitting this result to a management apparatus for managing the discernment information of the user; and key information acquisition means for, responding to said result, receiving the key information caused to correspond to the discernment information of the user from said management apparatus, and for causing said memory to store it.

A fifteenth invention for accomplishing the above-mentioned objectives is characterized in having means for monitoring a time limit of validity of the key information stored in said memory, and for, when the time limit of validity elapsed, causing said key information acquisition means to perform an acquisition process of new key information in the above-mentioned fourteenth invention.

A sixteenth invention for accomplishing the above-mentioned objectives is characterized in that said discernment information is one of authentication information specific to a user and ID information, or authentication information specific to a user and ID information in the above-mentioned twelfth invention.

A seventeenth invention for accomplishing the above-mentioned objectives, which is management apparatus for managing discernment information of a user that is employed for an authentication apparatus for supplying electronic key information to a resource, and for, when said key information is legitimate, making said resource available, is characterized in having:

a memory having discernment information of a user of a resource stored; and collation means for collating the discernment information to be transmitted from the authentication apparatus with the discernment information of the user stored in said memory to transmit a collation result.

An eighteenth invention for accomplishing the above-mentioned objectives is characterized in, in the above-mentioned seventeen invention, having:

a memory having the discernment information of a user of a resource and key information of said resource stored correspondingly; and means for receiving a result to the effect that the discernment information of the user stored in said authentication apparatus coincides with the discernment information input into said authentication apparatus from said authentication apparatus, and for, responding to this result, retrieving key information caused to correspond to said discernment information from said memory to transmit this key information to said authentication apparatus.

A nineteenth invention for accomplishing the above-mentioned objectives, which is a program of an authentication apparatus for supplying electronic key information to a resource, and for, when said key information is legitimate, making said resource available, is characterized in causing said authentication apparatus to function as means for retrieving discernment information that coincides with discernment information, which was input, from a memory having discernment information stored for identifying a user and key information to be supplied to a resource, and for, in a case where the discernment information that coincides exists, transmitting the stored key information to said resource.

A twentieth invention for accomplishing the above-mentioned objectives is characterized in that, in the above-mentioned nineteenth invention, said program causes said authentication apparatus to function as means for:

transmitting the discernment information that was input to a management apparatus for managing the discernment information of the user; and in a case where the result that said discernment information of said user input from said management apparatus coincided with the discernment information of the user stored in said management apparatus was obtained, causing the memory to store said discernment information that was input.

A twenty-first invention for accomplishing the above-mentioned objectives, which is a program of a management apparatus for managing discernment information of a user to be employed for an authentication apparatus for supplying electronic key information to a resource, and for, when said key information is legitimate, making said resource available, is characterized in causing said management apparatus to function as means for collating discernment information of a user of a resource stored in a memory with the discernment information transmitted from an authentication apparatus to transmit this collation result.

A twenty-second invention for accomplishing the above-mentioned objectives is characterized in that, in the above-mentioned twenty-first invention, said program causes said management apparatus to function as means for receiving a result to the effect that the discernment information of the user stored in said authentication apparatus coincides with the discernment information input into said authentication apparatus from said authentication apparatus, and for, responding to this result, retrieving key information caused to correspond to said discernment information from the memory having the discernment information of the user of the resource and the key information of said resource stored correspondingly to transmit the retrieved key information.

A twenty-third invention for accomplishing the above-mentioned objectives, which is a method of registering information for authenticating an electronic key information system to an authentication apparatus, is characterized in having the steps of:

in registering discernment information of a user to the authentication apparatus, transmitting the discernment information input into said authentication apparatus to a management apparatus for managing the discernment information;

in said management apparatus, collating the discernment information transmitted from said authentication apparatus with the pre-registered discernment information of the user, and for, in a case where it coincided, transmitting its collation result to said authentication apparatus; and in said authentication apparatus, receiving a collation result of coincidence from said management apparatus to register said discernment information that was input as discernment information for authenticating a user.

A twenty-fourth invention for accomplishing the above-mentioned objectives is characterized in, in the above-mentioned twenty-third invention, further having the steps of:

in registering key information of a resource to said authentication apparatus, inputting the discernment information into said authentication apparatus;

collating said transmitted discernment information with the discernment information of the user stored in said authentication apparatus, and for, in a case where it coincided as a result of collation, transmitting said discernment information to said management apparatus;

retrieving key information stored correspondingly to said transmitted discernment information to transmit this key information to said authentication apparatus; and registering said key information transmitted from said management apparatus to said authentication apparatus.

A twenty-fifth invention for accomplishing the above-mentioned objectives is characterized in that said discernment information is one of authentication information specific to a user and ID information, or authentication information specific to a user and ID information in the above-mentioned twenty-third invention.

A twenty-sixth invention for accomplishing the above-mentioned objectives is characterized in monitoring a time limit of validity of the key information stored in said authentication apparatus, and in a case where the time limit of validity of said key information elapsed, registering new key information to said authentication apparatus in the above-mentioned twenty-fifth invention.

As described above, so as to confirm whether a user is legitimate in supplying the key information to the resource in the authentication apparatus, the present invention causes the discernment information for identifying a user to be input, and only in a case where this discernment information coincided with the stored discernment information of the user, supplies the key information to the resource.

Assuming such a configuration allows utilization of the resource by an unjust user caused by loss/theft etc. of the authentication apparatus, which was a problem of the prior art, to be prevented.

Also, in causing the authentication apparatus to register (store) the discernment information of the user, the present invention causes the discernment information to be input, collates this discernment information with the discernment information registered to the management apparatus, and only in a case where it coincided, causes the authentication apparatus to register (store) the discernment information.

Assuming such a configuration enables insurance of a security in distributing the key, which was a problem of the prior art.

Further, in having caused the authentication apparatus to register (store) the discernment information, the present invention sends this legitimate discernment information to the management apparatus, transmits the key information caused to corresponded to the legitimate discernment information from the management apparatus to the authentication apparatus, and causes the authentication apparatus to store the key information.

Assuming such a configuration enables makes it possible to continue to utilize the resource safely and quickly also at the time of loss/disappearance of the authentication apparatus, which was a problem of the prior art, by obtaining a new authentication apparatus.

DETAILED DESCRIPTION OF THE PREFERRED EMBODIMENTS

The embodiment 1 of the present invention will be explained together with the accompanied drawings.

Figure 1:
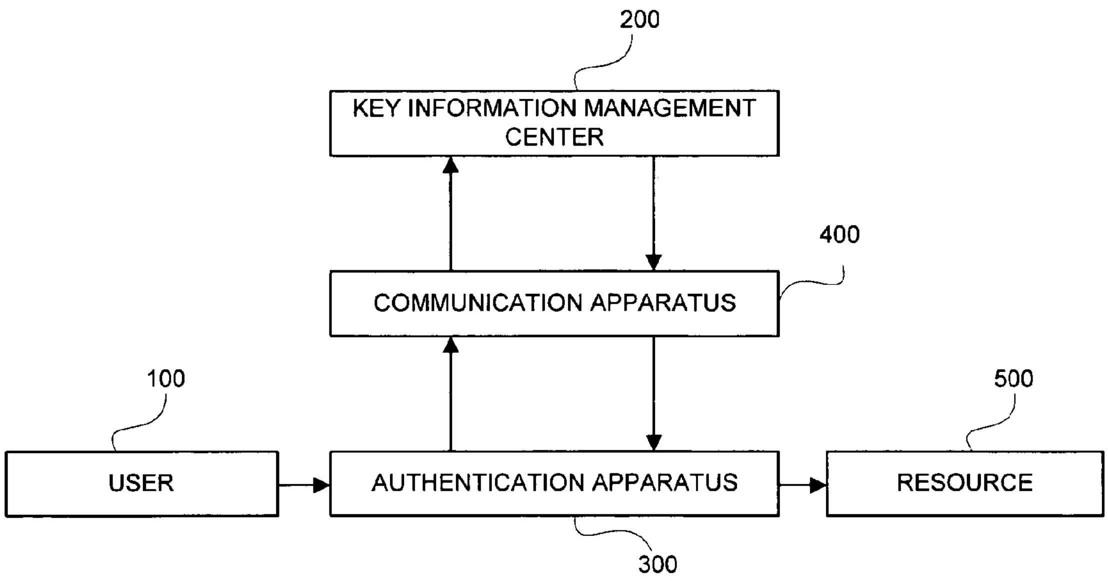
FIG. 1 is a system configuration view of an embodiment 1.

FIG. 1 shows a system configuration view of one embodiment of an electronic key information system relating to the present invention. As shown in an identical figure, the electronic key information system of this embodiment is comprised of a key information management center 200 for managing electronic key information, an authentication apparatus 300 to be utilized by a user 100, a communication apparatus 400 for controlling communication between the authentication apparatus 300 and the key information management center 200, and a resource 500 that the user 100 utilizes, and a network between each of them and the other.

Figure 2:
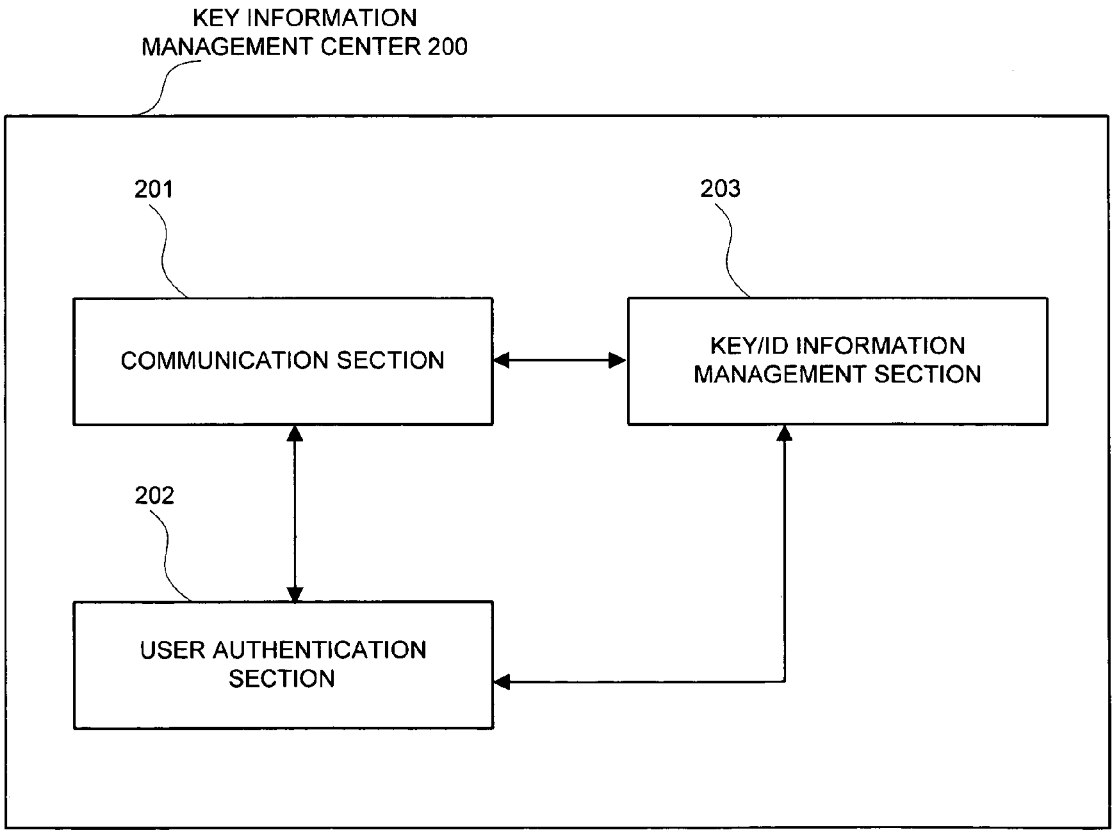
FIG. 2 is a configuration view of one embodiment of a key information management center 200.

Next, a configuration of each configuration block of the electronic key information system of this embodiment will be explained together with FIG. 2 to FIG. 5. FIG. 2 shows a configuration view of one embodiment of the key information management center 200. As shown in an identical figure, the key information management center 200 is comprised of a communication section 201, a user authentication section 202, and a key/ID information management section 203.

The communication section 201 is an apparatus for making communication with the authentication apparatus 300 via the communication apparatus 400 of FIG. 1.

The user authentication section 202 is for authenticating the user 100 with the discernment information for identifying the user 100. In this embodiment, two of ID information of the user 100 and authentication information of the user 100 are assumed to be used as discernment information for identifying the user 100, and the user authentication section 202, which has the ID information of the user 100 and the authentication information of the user 100 pre-stored correspondingly, authenticates the user 100 with the ID information and authentication information of the user 100. Additionally, the so-called authentication information is fingerprint information of the user, a password that the user decided, etc.

The key/ID information management section 203 is a section for storing/managing the key information necessary for utilizing the resource 500 of FIG. 1 correspondingly to the ID information of the user who can utilize the resource 500. Additionally, herein, the key information was caused to be stored correspondingly to the ID information of the user who can utilize the resource 500; however in a case where the discernment information for identifying the user 100 is only authentication information, the key information may be caused to be stored correspondingly to the authentication information of the user.

Figure 3:
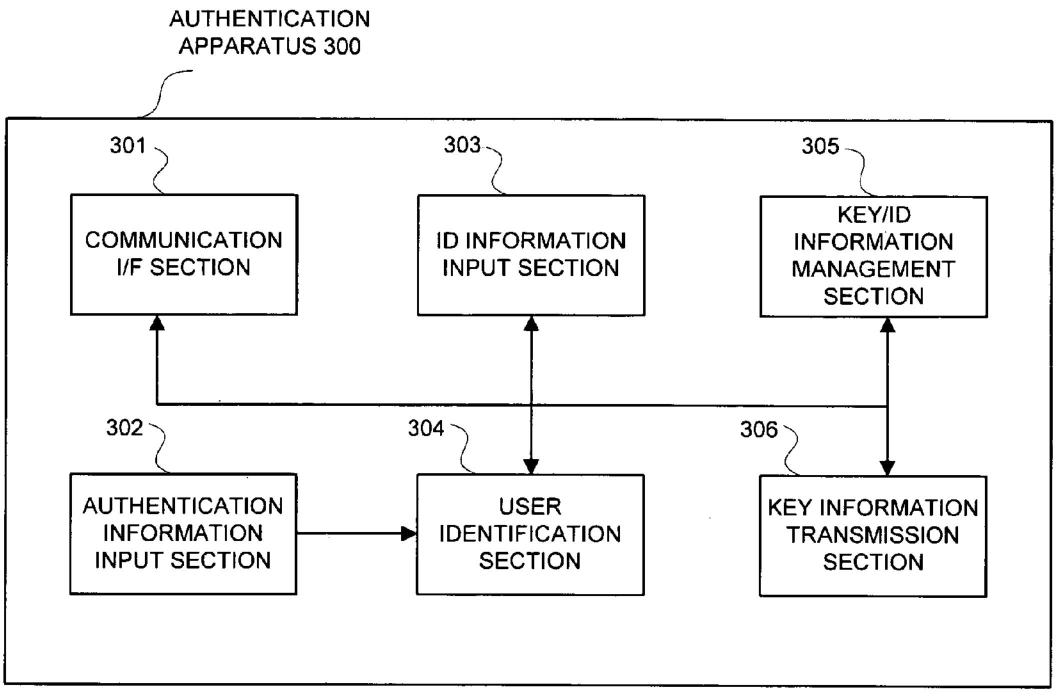
FIG. 3 is a configuration view of one embodiment of an authentication apparatus 300.

FIG. 3 shows a configuration view of one embodiment of the authentication apparatus 300. As shown in an identical figure, the authentication apparatus 300 is comprised of a communication I/F section 301, an authentication information input section 302, an ID information input section 303, a user identification section 304, a key/ID information management section 305, and a key information transmission section 306. This authentication apparatus 300, which is, for example, a terminal apparatus that the user 100 carries, and an electronic key such as a key of a car, has a function of filing the key information.

The communication I/F section 301 is an interface apparatus (I/F apparatus) for connecting the communication apparatus 400 that provides a function of communication with the key information management center 200 shown in FIG. 1 and FIG. 2. For example, in a case where the communication apparatus 400 is a mobile telephone and a communication modem, the communication I/F section 301 is comprised of a connector for connecting the authentication apparatus 300 hereto, a communication driver etc.

The authentication information input section 302 is an apparatus into which the user 100 inputs the authentication information. For example, it is a keyboard and a mouse for inputting the foregoing password, a scanner for inputting the foregoing fingerprint information, and so on.

The ID information input section 303 is an apparatus into which the user 100 inputs the ID information. For example, it is a keyboard etc. for inputting numerical characters and character strings. Additionally, in a case where the authentication information is a password that is comprised of the numerical characters, the character strings, etc., the ID information is also comprised of the numerical characters, the character strings, etc. similarly, one member such as a keyboard can serve both as the authentication information input section 302 and the ID information input section 303.

The user identification section 304 is for identifying the user 100 with the discernment information for identifying the user 100. In this embodiment, the user identification section 304 has the ID information of the user 100 and the authentication information of the user 100 pre-stored correspondingly because, as described above, two of the ID information of the user 100 and the authentication information of the user 100 were employed as discernment information for identifying the user 100. And, the ID information of the user is specified from the authentication information input from the authentication information input section 302. Additionally, in this embodiment, at the time of using the authentication apparatus 300 normally, only the authentication information is employed as identification of the user; however not only the authentication information but also the ID information of the user may be input from the ID information input section 303 to identify the user from both of the authentication information and the ID information. In this case, a configuration is made so that it is determined whether the authentication information and ID information that were input coincide with the stored authentication information and ID information respectively, and in a case where they coincided respectively, the ID information of its user is specified.

The key/ID information management section 305 is for managing the key information necessary for utilizing the resource 500 correspondingly to the ID information of the user who can utilize it. Additionally, in this embodiment, as described above, the ID information and the key information of the user 100 were managed correspondingly because two of the ID information of the user 100 and the authentication information of the user 100 were employed as discernment information for identifying the user 100; however the authentication information and the key information of the user 100 may be managed correspondingly;

The key information transmission section 306 is an apparatus for transmitting the key information to the resource 500.

Figure 4:
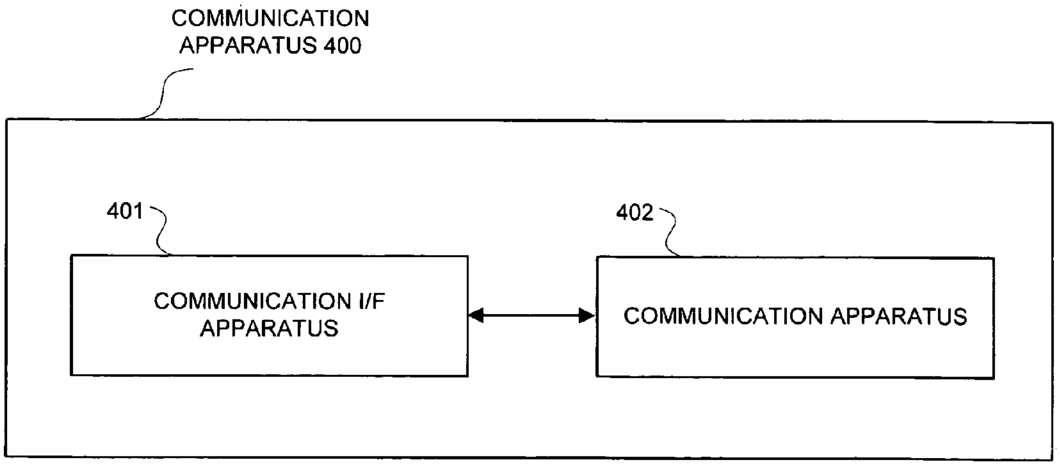
FIG. 4 is a configuration view of one embodiment of a communication apparatus 400.

FIG. 4 shows a configuration view of one embodiment of the communication apparatus 400.

As shown in an identical figure, the communication apparatus 400 is comprised of a communication I/F apparatus 401 and a communication apparatus 402. The communication I/F apparatus 401 is an interface apparatus (I/F apparatus) for connecting the communication apparatus 400 for providing a function of communication with the key information management center 200 to the authentication apparatus 300. Also, the communication apparatus 402 is an apparatus for making communication with the key information management center 200. As a specific example of the communication apparatus 400, as described above, there is a mobile telephone, a communication modem, etc.

Figure 5:
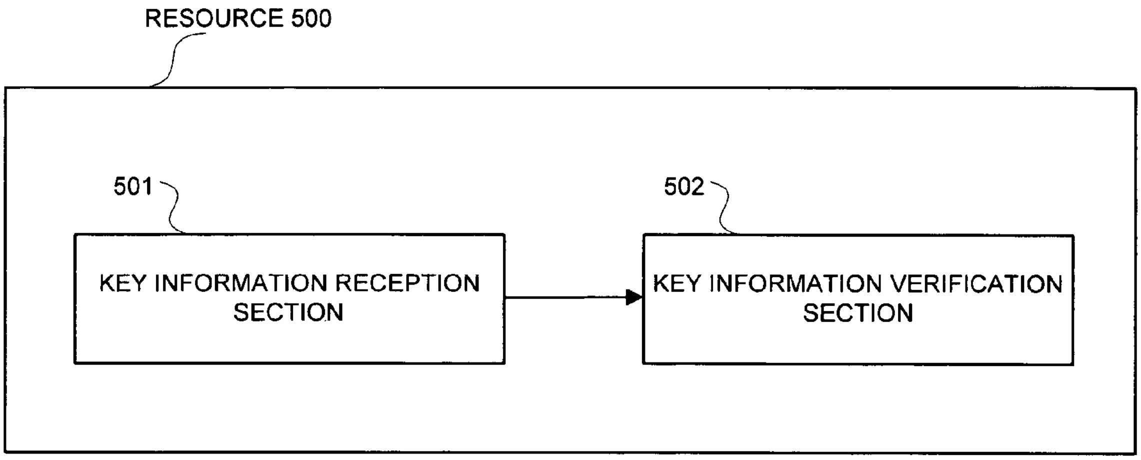
FIG. 5 is a configuration view of one embodiment of a resource 500.

FIG. 5 shows a configuration view of one embodiment of the resource 500.

As shown in an identical figure, the resource 500 is comprised of a key information reception section 501 and a key information verification section 502. The key information reception section 501 is an apparatus for receiving the key information transmitted from the authentication apparatus 300. The key information verification section 502, to which the key information was registered, is an apparatus for comparing this stored key information with the key information transmitted from the authentication apparatus 300 to verify whether the key information is correct.

Herein, the key information will be explained. As to the key information, various cases are considered such as a case where the resource 500 has it originally, a case where it is issued to the user by the resource 500, or a case where the third party issues it to a specific user newly. A specific example of a case where the resource 500 has it originally is a case such that at the moment that the authentication apparatus 300 was prepared, the authentication apparatus 300 is given the key information. A specific example of a case where the key information is issued by the resource 500 is a case such that, in a case where the resource 500 is a computer or something like it, a process of a computer causes the key information to be generated. A specific example of a case where the key information is issued by the third party newly is a case such that the third party issues the key information newly because the authentication apparatus 300 was lost. Anyway, this key information is sent to the key information management center 200 together with the discernment information of the user via a legitimate and artificial route, or with electric communication means, and is stored in the key/ID information management section 203.

Next, an operation of the electronic key information system of this embodiment that is comprised of each of the above-mentioned configuration blocks will be explained.

Figure 6:
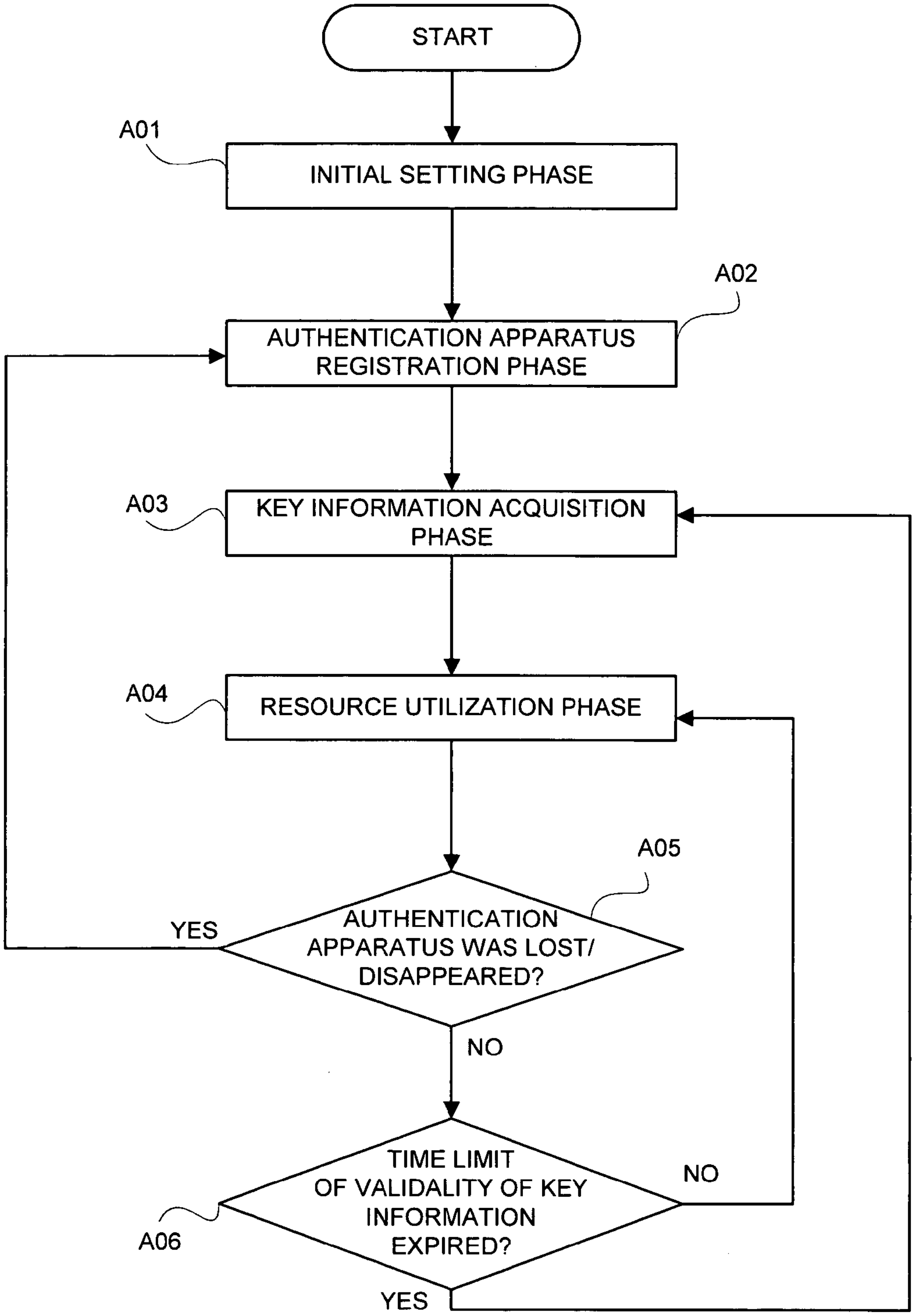
FIG. 6 is a flowchart for explaining a schematic operation of one embodiment of this invention system.

FIG. 6 is a flowchart for explaining a schematic operation of one embodiment of the electronic key information system relating to the present invention.

As shown in an identical figure, at first, the authentication information and ID information of the user, and the key information for utilizing the resource 500 are registered to the key information management center 200 at an initial setting phase (step A01).

Continuously, it is determined in an authentication apparatus registration phase whether or not the authentication information and ID information input from the user 100 are legitimate, and the user 100 is a legitimately privileged person (step A02).

Continuously, the ID information of the legitimately privileged person is transmitted from the authentication apparatus

300 to the key information management center 200 via the communication apparatus 400 in a key information acquisition phase to file the key information received from the key information management center 200 in the authentication apparatus 300 correspondingly to the ID information of the user based upon its ID information (step A03).

In a resource utilization phase, retrieving the key information that corresponds to the correctly-specified ID information with the authentication information in the authentication apparatus 300 to transmit it to the resource 500 causes the resource 500 to authenticate the key information, and only in a case where the key information was able to be authenticated correctly, the resource 500 becomes available (step A04).

Continuously, it is determined whether the authentication apparatus 300 was lost/disappeared after a finish of the resource utilization phase A04 (step A05), and when the authentication apparatus 300 was lost/disappeared, a new authentication apparatus is obtained again to execute the steps beginning with the authentication apparatus registration phase A02, and to restore the key information on the new authentication apparatus.

Also, in this embodiment, so as to enhance a security, it is also possible to set the time limit of validity for the key information filed in the key/ID information management section 305 of the authentication apparatus 300.

In a case where the time limit of validity was set, the key/ID information management section 305 determines whether the time limit of validity of the key information expired (step A06), when the time limit of validity of the key information did not expire, it executes the resource utilization phase of the step A04 without a break, and in a case where the resource 500 became impossible to utilize because the time limit of validity of the key information expired, the operation proceeds to the key information acquisition phase of the step A03 to obtain valid key information again.

Next, a process of each phase of the steps A01 to A04 of FIG. 6 will be further explained in details.

Figure 7:
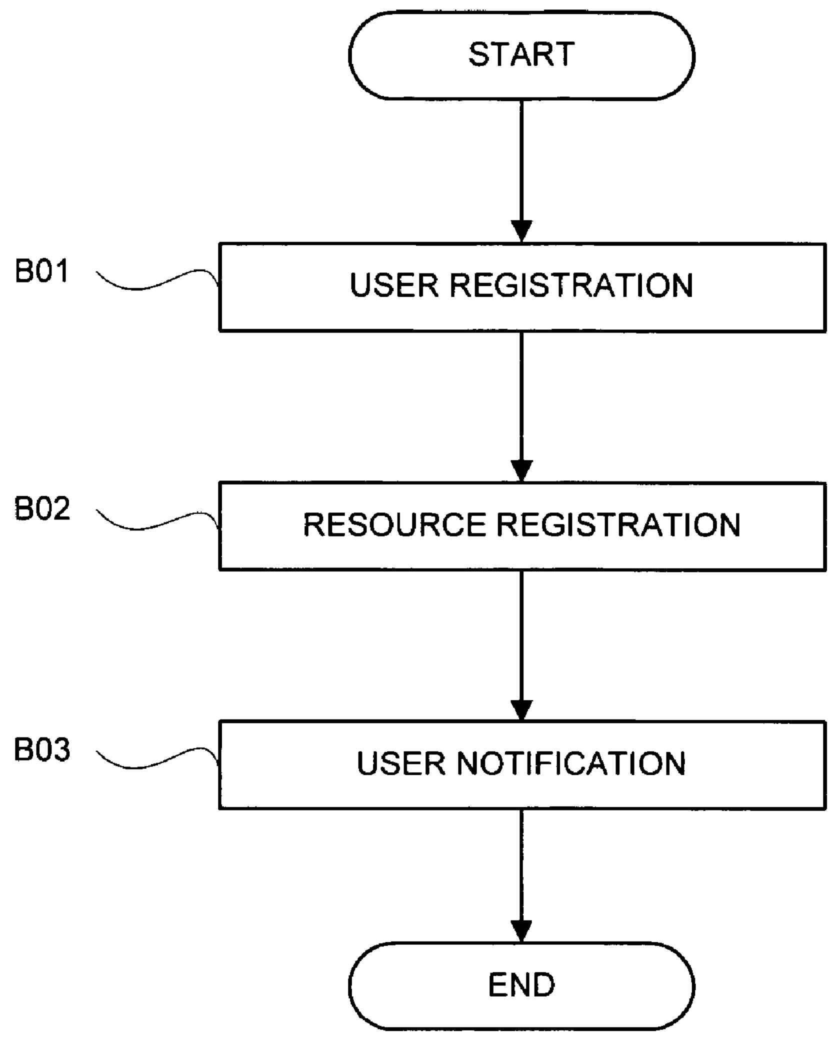
FIG. 7 is a flowchart for explaining an operational procedure of an initial setting phase of a step A01 of FIG. 6.

FIG. 7 shows a flowchart of an operational procedure of the initial setting phase that is the step A01 of FIG. 6.

In FIG. 7, in the initial setting phase, at first, the authentication information and ID information of the user are registered to the user authentication section 202 within the key information management center 200 of FIG. 1 (step B01).

Next, the key information that the resource 500 has originally or the key information that the resource 500 issued to a specific user in order to utilize the resource 500 is registered to the key/ID information management section 203 together with the ID information of the user who can utilize it (step B02).

Thereafter, the effect that the resource 500 became available is notified to the user 100 (step B03).

This initial setting phase is directly (by a paper or by the user 100's proceeding to a specific location, or by employing electric communication means of which a security is high) executed for the key information management center 200 by the user 100 without passing through the communication apparatus 400. The user registration of the step B01 in this initial setting phase is executed only once when the user 100 starts to use this system.

Figure 8:
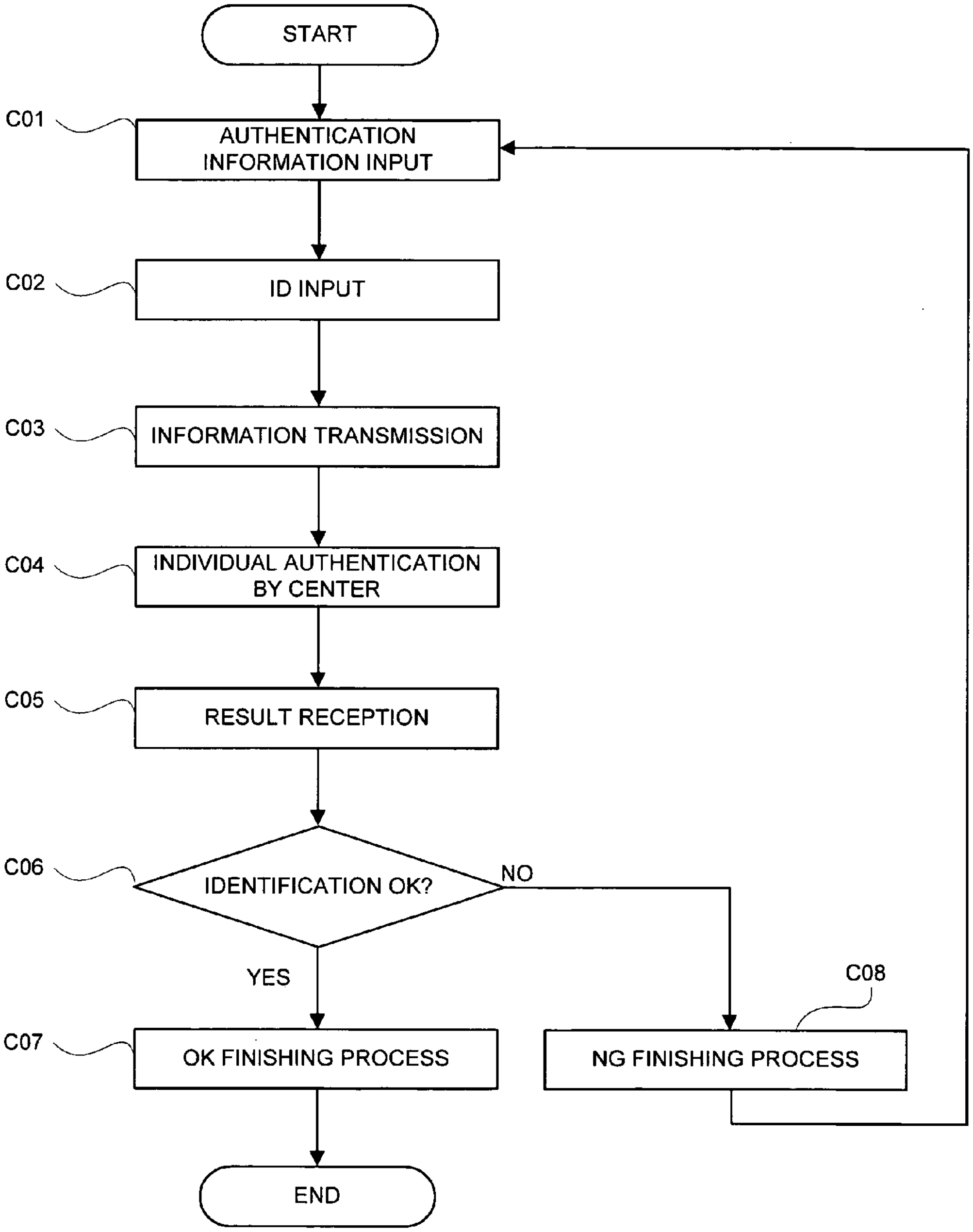
FIG. 8 is a flowchart for explaining an operational procedure of an authentication apparatus registration phase of a step A02 of FIG. 6.

Next, FIG. 8 shows a flowchart of an operational procedure of the authentication apparatus registration phase that is the step A02 of FIG. 6.

In FIG. 8, at first, the user 100 of FIG. 1 inputs his/her own authentication information by employing the authentication information input section 302 of the authentication apparatus 300 (step C01).

Next, the user 100 inputs his/her own ID information by employing the ID information input section 303 of the authentication apparatus 300 of FIG. 3 (step C02).

Thereafter, the authentication apparatus 300 transmits the authentication information and ID information of the user 100 that were input to the key information management center 200 via both of the communication I/F section 301 and the communication apparatus 400 (step C03).

The key information management center 200 receives the authentication information and ID information transmitted from the authentication apparatus 300 in the communication apparatus 201, and confirms in the user authentication section 202 whether its received authentication information and ID information coincide with the authentication information and ID information registered in the user authentication section 202 in said initial setting phase respectively (step C04).

And, the key information management center 200 transmits its confirmation result to the authentication apparatus 300, and causes the authentication apparatus 300 to receive it (step C05).

In a case where the authentication apparatus 300 received the confirmation result indicating that the received authentication information and ID information coincided with the stored ones respectively from the user authentication section 202 within the key information management center 200, it registers the authentication information and ID information that were input to the user identification section 304 (step C07).

On the other hand, in a case where the authentication apparatus 300 received the confirmation result indicating that they did not coincide respectively, it cancels the authentication information and ID information that were input, and performs the authentication apparatus registration phase A02 again (step C08).

In such a manner, when the authentication apparatus 300 is used in the first place, the user is identified in the key information management center 200, in a case where the identification succeeded, the authentication information and ID information received in the authentication apparatus 300 from the key information management center 200 via the communication apparatus 400 are registered to the user identification section 304, thereby enabling the user identification only with the authentication information and ID information of the user identification section 304 thereafter.

Figure 9:
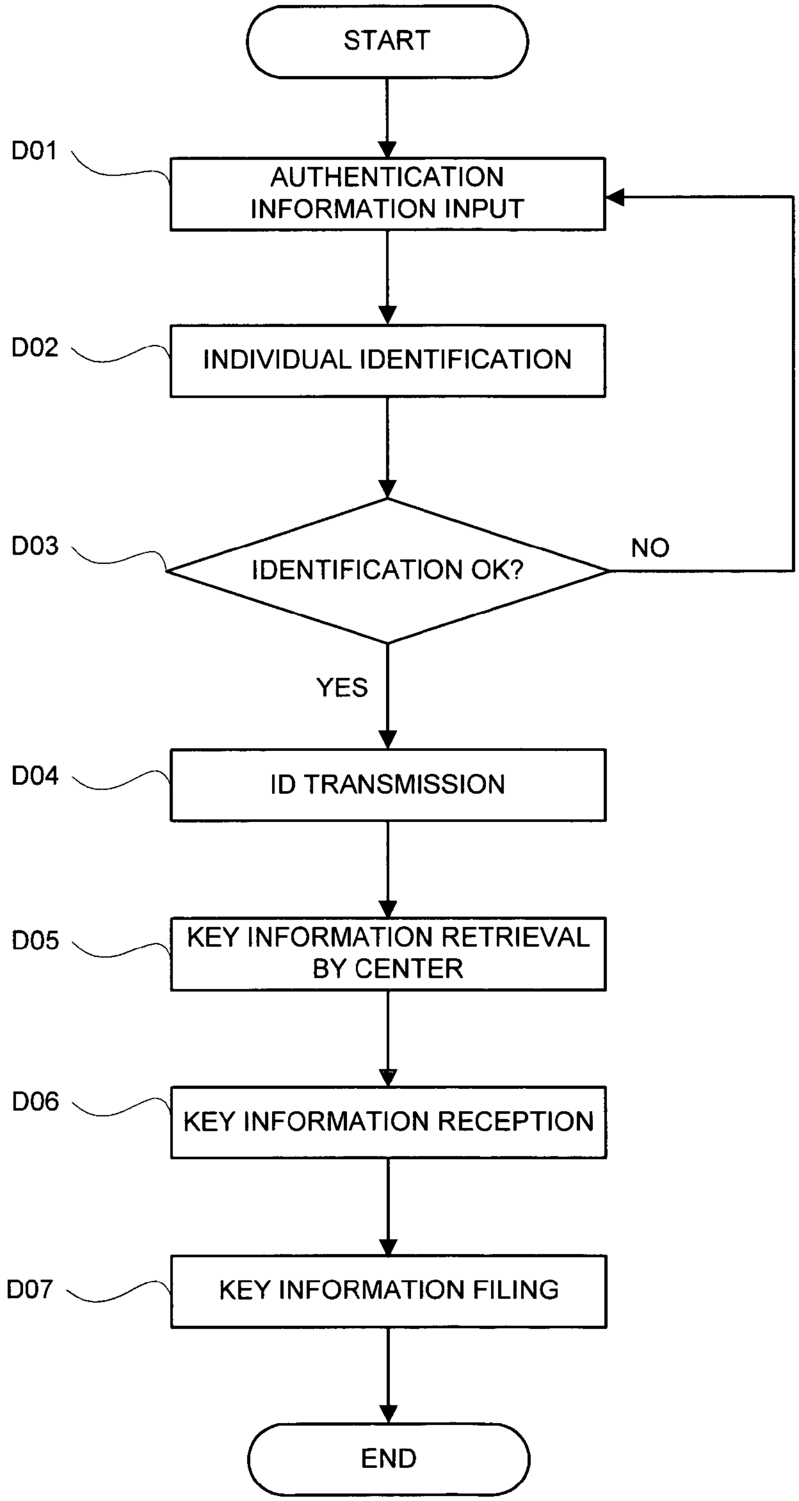
FIG. 9 is a flowchart for explaining an operational procedure of a key information acquisition phase of a step A03 of FIG. 6.

FIG. 9 shows a flowchart of an operational procedure of the key information acquisition phase that is the step A03 of FIG. 6.

In FIG. 9, at first, the user 100 inputs the authentication information by employing the authentication information input section 302 of the authentication apparatus 300 (step D01).

Hereupon, the authentication apparatus 300 specifies the ID information that corresponds to the authentication information, which was input, from among kinds of ID information stored by the user identification section 304 (step D02).

In a case where the authentication apparatus 300 was not able to specify it, the operation returns to the step D01, and it performs the key information acquisition phase A03 again from the beginning. In a case where the authentication apparatus 300 was able to specify it correctly, it transmits the specified ID information to the key information management center 200 from the communication I/F section 301 via the communication apparatus 400 (step D04).

The key information management center 200 retrieves the key information caused to correspond to the ID information transmitted from the above-mentioned authentication apparatus 300, which was received in the communication apparatus 201, by employing the key/ID information management section 203 (step D05), and transmits the retrieved key information to the authentication apparatus 300.

The authentication apparatus 300 receives the key information transmitted from the key information management center 200 in the communication I/F apparatus 301 (step D06), and files it correspondingly to the ID information of the user in the key/ID information management apparatus 305 (step D07).

Additionally, in the step D01, only the authentication information of the user 100 was input as discernment information of a user; however it is not limited hereto, and the ID information of the user also may be input. In this case, in the step D02, only when the discernment information and ID information of the user coincided with the stored discernment information and ID information respectively, a process of specifying the ID information is performed.

Figure 10:
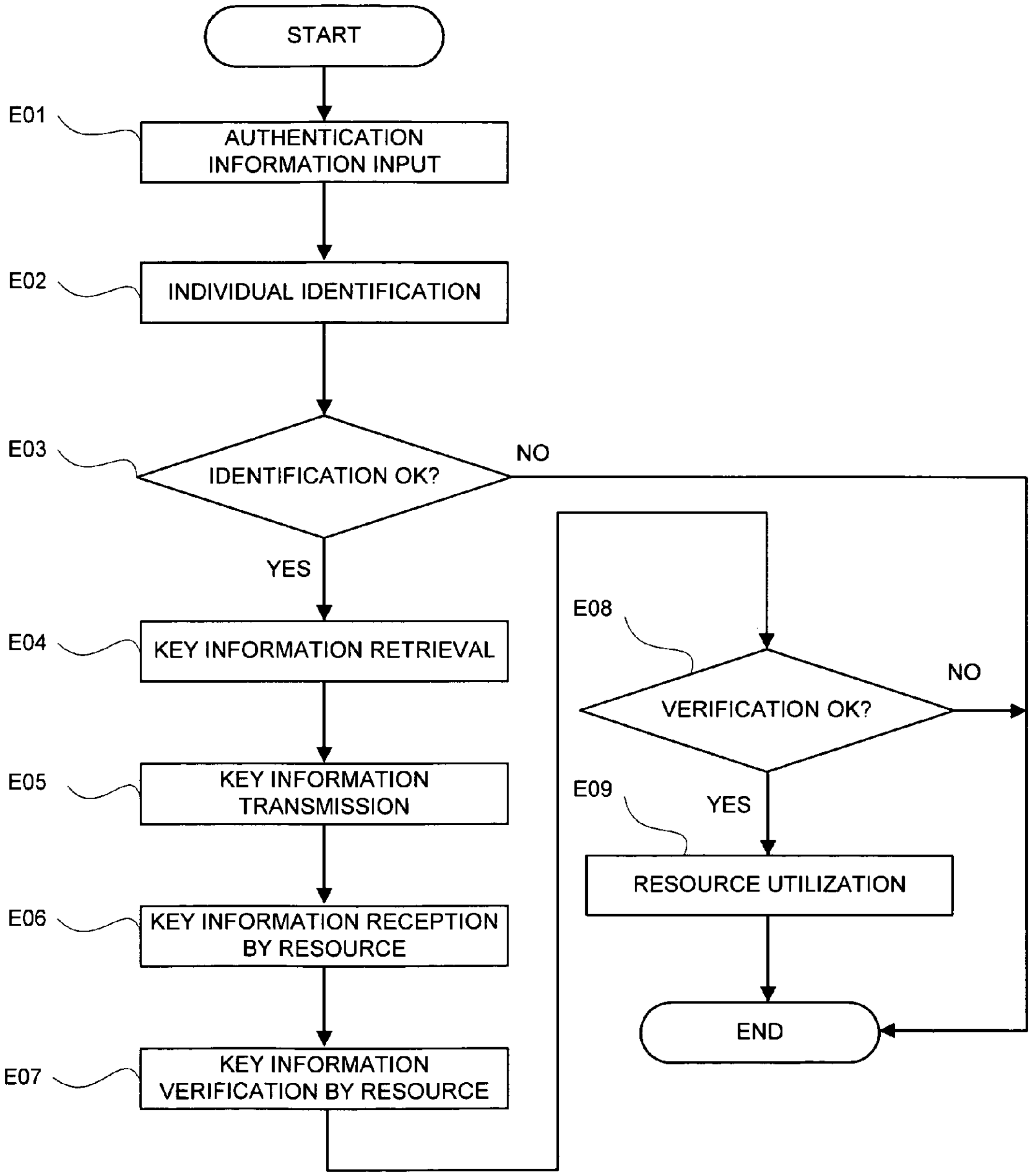
FIG. 10 is a flowchart for explaining an operational procedure of a resource utilization phase of a step A04 of FIG. 6.

A resource utilization phase is performed according to the procedure of the flowchart of FIG. 10 subsequently to the above-mentioned key information acquisition phase. FIG. 10 shows a flowchart of an operational procedure of the resource utilization phase that is the step A04 of FIG. 6.

In FIG. 10, at first, in a case where the user 100 utilizes the resource 500, he/she inputs the authentication information by employing the authentication information input section 302 within the authentication apparatus 300 of FIG. 3 (step E01).

Hereupon, the authentication apparatus 300 specifies the ID information that corresponds to the authentication information, which was input, from among kinds of the ID information stored by the user identification section 304 within the authentication apparatus 300 (step E02). When ID information was impossible to specify, this resource utilization phase is finished; however in a case where the ID information was correctly specified, the authentication apparatus 300 retrieves the key information that corresponds to its ID information in the key/ID information management apparatus 305 (step E04).

Continuously, the authentication apparatus 300 transmits the retrieved key information to the resource 500 from the key information transmission section 306 (step E05).

The resource 500 receives the key information transmitted from the authentication apparatus 300 in the key information reception section 501 (step E06), and makes a verification as to whether or not the received key information is key information, which was stored, in the key information verification section 502 (step E07). Only in a case where validity of the key information was verified, the resource 500 becomes available.

In such a manner, in this embodiment, making a configuration so that the key information necessary for utilizing the resource 500 is managed correspondingly to the ID information of the user who can utilize it in the key information management center 200 to identify the user in acquiring and using the key information allows a high security to be insured.

Accordingly, for example, in a case where this embodiment was applied for the foregoing immobilizer of a car, the authentication apparatus 300 is an engine key with an specific-ID transmission function, and the resource 500 is equivalent to an engine ECU (Electronic Control Unit); however even though a person who stole the engine key with an specific-ID transmission function tries to use it unjustly, the unjust use can be prevented owing to the user identification employing the authentication information or the ID information because the unjust user does not know the authentication information or the ID information of the legitimate user.

Also, in this embodiment, even though loss or disappearance occurred of the authentication apparatus 300 having the key information filed, which the user 100 carried, when the authentication information and ID information input from a new authentication apparatus coincide with ones stored within the key information management center 200 respectively, the new authentication apparatus is caused to receive the authentication information and ID information transmitted from the key information management center 200, which are registered to its user identification section 304, and thereafter, the authentication information registered to the new authentication apparatus is input, thereby allowing the new authentication apparatus to download the key information that responded to the ID information from the key information management center 200 by means of the communication between the authentication apparatus and the key information management center 200, whereby the key information can be restored safely and yet quickly, which makes it possible to continue to utilize the resource.

Accordingly, in a case where this embodiment was applied for the above-mentioned immobilizer of the car, even though the engine key with a specific-ID transmission function was lost, the user, who is a legitimate user, can download the key information for using the engine ECU safely and yet quickly that is a resource to the newly obtained engine key with a specific-ID transmission function from the key information management center 200, which makes it possible to start the engine ECU quickly.

Additionally, as the resource 500, which is an entity for providing a specific function, there are doors of a house, a car, etc., a mobile telephone, a personal computer, and appliances/apparatuses requiring the authentication of the user, in addition to the engine ECU, for anyone of which the present invention can be applied. Also, the so-called utilization of the resource 500 is to start the engine if the resource 500 is an engine ECU, to lock/unlock/open and shut a door if it is a door of a house, a car etc., to utilize a mobile telephone, if it is a mobile telephone, to utilize a log-in function of a personal computer, if it is a personal computer, and so on.

Additionally, in the foregoing explanation, the communication apparatus 400 was provided so that the authentication apparatus 300 made communication with the key information management center 200; however the communication apparatus 400 can be provided within the authentication apparatus 300.

An embodiment 2 of the present invention will be explained.

As apparent from the explanation above, both of the key information management center 200 and the authentication apparatus 300 of the embodiment 1, which can be configured with hardware, can be realized with a computer program as well.

Figure 11:
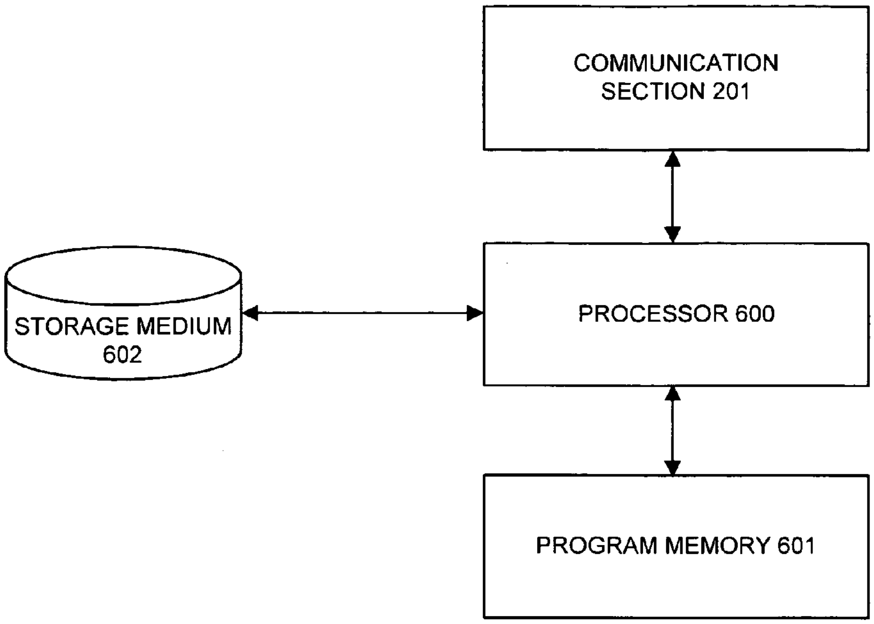
FIG. 11 is a general block configuration view of an information process apparatus having one part of the key information management center 200 implemented.

FIG. 11 is a general block configuration view of an information process apparatus having one part of the key information management center 200 implemented.

The information process apparatus shown in FIG. 11 has a processor 600, a program memory 601, and a storage medium 602.

The storage medium 602, which is equivalent to a storage function of the user authentication section 202 and the key/ID information management section 203 in the embodiment 1, may be a separate storage medium, and may be a storage region that is comprised of an identical storage medium. As a storage medium, a magnetic storage medium such as a hard disc can be employed.

The program memory 601 has a program filed for causing the processor 600 to execute a process as the user authentication section 202 and the key/ID information management section 203 in the foregoing embodiment 1, and the processor 600 operates according to this program.

Additionally, the processor 600 may be configured to perform one part of the process of the communication section 201.

As apparent from the explanation above, it is also possible to realize the entirety or one part of the hardware by means of the computer program.

Figure 12:
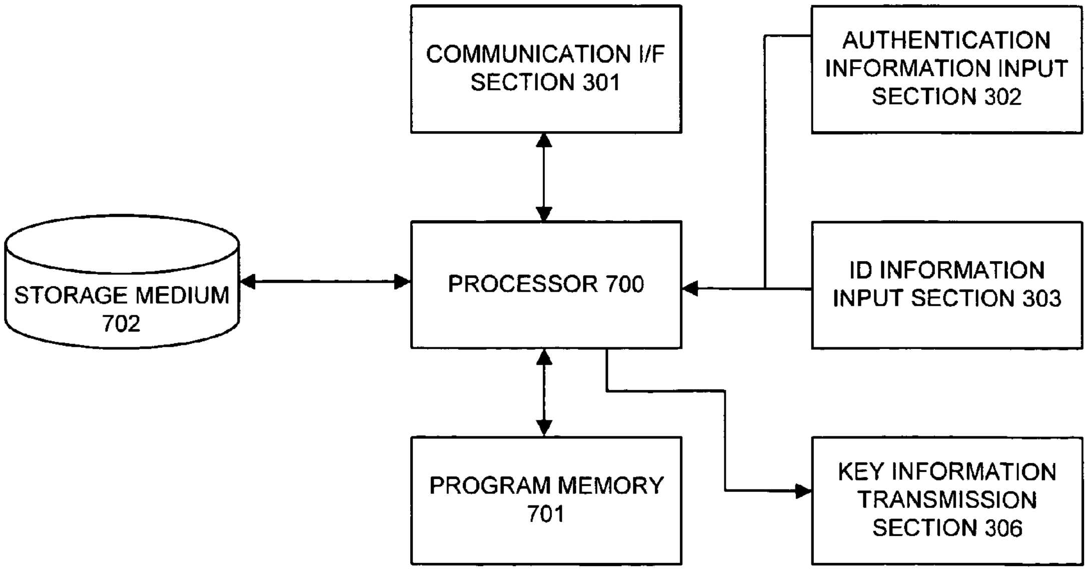
FIG. 12 is a general block configuration view of an information process apparatus having one part of the authentication apparatus 300 implemented.

Also, the authentication apparatus 300 can be configured by the information processing apparatus shown in FIG. 12.

The information process apparatus shown in FIG. 12 has a processor 700, a program memory 701, and a storage medium 702.

The storage medium 702, which is equivalent to the storage function of the user identification section 304 and the key/ID information management section 305 in-the embodiment 1, may be a separate storage medium, and may be a storage region that is comprised of an identical storage medium. As a storage medium, an IC chip, a magnetic storage medium such as a hard disc can be employed.

The program memory 701 has a program filed for causing the processor 700 to execute a process as the user identification section 304 and the key/ID information management section 305 in the foregoing embodiment 1, and the processor 700 operates in according to this program.

Additionally, the processor 700 may be configured to perform one part of the process of the communication IF section 301 and the key information transmission section 306.

As explained above, in accordance with the present invention, a configuration was made so that the user identification was carried out at least in registering the authentication apparatus, and acquiring the key information, and further, also in using the key information, whereby even though another person's authentication apparatus was obtained with an unjust method, it is impossible to cause it to function, which allows a higher security to be insured as compared with the conventional one.

Also, in accordance with the present invention, a form is assumed of managing the key information in the key information management center in a concentrated manner, and of downloading it to the authentication apparatus via individual identification for use, whereby even though loss etc. of the authentication apparatus occurred, downloading the key information to a newly obtained authentication apparatus from the key information management center allows utilization of the resource to be continued safely and quickly.

What is claimed is:

1. An electronic key information system for supplying electronic key information from an authentication apparatus that a user possesses to a resource that is an appliance/apparatus requiring authentication of said user, and for, only when the above key information is legitimate, making the above resource available, said electronic key information system having:

a key information management center for managing said key information in a concentrated manner that comprises: an information management apparatus for prestoring said discernment information of said user and said key information of said resource correspondingly; an interface apparatus for making communication with said authentication apparatus; and a user authentication apparatus for registering said discernment information of said user; and a communication apparatus for controlling communication between said key information management center and said authentication apparatus, wherein said authentication apparatus has:

authentication apparatus registration means for transmitting said discernment information of said user, which was input, to said key information management center via said communication apparatus, and for, when the authentication result that the above discernment information coincided with discernment information stored in said user authentication apparatus was transmitted and received from said key information management center via said communication apparatus, registering its discernment information; and key information acquisition means for transmitting the discernment information of the user registered to said authentication apparatus registration means to said key information management center via said communication apparatus, and for, when said key information stored in said information management apparatus was transmitted and received via said communication apparatus responding to the received discernment information from the above key information management center that received the above discernment information, storing its reception key information, and wherein said authentication apparatus supplies said key information stored in said key information storage means to said resource, and utilizes the above resource.

2. The electronic key information system according to claim 1, wherein when the discernment information of the user input into said authentication apparatus can be specified by the discernment information of the user registered to said authentication apparatus registration means, said authentication apparatus registration means perform a key information acquisition operation by said key information acquisition means.

3. The electronic key information system according to claim 1, wherein when said discernment information of said user input into said authentication apparatus can be specified by the discernment information of the user registered in said authentication apparatus registration means, said authentication apparatus transmits the key information stored by said key information acquisition means to said resource.

4. The electronic key information system according to claim 1, wherein said authentication apparatus further has time limit management means for monitoring a time limit of validity of said received key information stored by said key information acquisition means, and for, when the above time limit of validity elapsed, causing said key information acquisition means to acquire said key information again from said key information management center.

5. The electronic key information system according to claim 1, wherein said resource has verification means for, when said key information transmitted from said authentication apparatus was received, verifying the above received key information, and wherein only when the key information was correctly verified by the above verification means, utilizing the above resource by said authentication apparatus is enabled.

6. The electronic key information system according to claim 1, wherein said discernment information is comprised of authentication information specific to a user and ID information.

7. The electronic key information system according to claim 6, wherein said authentication information is fingerprint information.

8. An electronic key information system having:

a management apparatus in which discernment information of a user of a resource is stored, said management apparatus collating the discernment information of the user to be transmitted with said stored discernment information to transmit a collation result; and an authentication apparatus having: discernment information storage means for transmitting the discernment information of the user that was input to said management apparatus, and for, in a case where the result that said discernment information of said user that was input coincided with the discernment information of the user stored in said management apparatus was obtained, storing said discernment information of said user that was input; and discernment information collation means for collating the discernment information of the user that was input in utilizing the resource with the discernment information of the user stored in said discernment information storage means, and for, in a case where it coincided, transmitting the stored key information to said resource.

9. The electronic key information system according to claim 8, wherein said authentication apparatus has key information acquisition means for collating the discernment information of the user that was input with the discernment information of the user stored in said discernment information storage means, and for, in a case where it coincided, transmitting said discernment information to said management apparatus, and for storing the key information to be transmitted from said management apparatus responding hereto; and wherein said management apparatus has means in which the discernment information of the user of the resource and the key information of said resource are stored correspondingly, said means retrieving the key information caused to correspond to said discernment information to transmit this key information to said authentication apparatus responding to the discernment information of the user to be transmitted from said authentication apparatus.

10. The electronic key information system according to claim 8, wherein said discernment information is one of authentication information specific to a user and ID information, or authentication information specific to a user and ID information.

11. The electronic key information system according to claim 9, wherein said authentication apparatus has means for monitoring a time limit of validity of the said stored key information, and for, when the time limit of validity elapsed, causing said key information acquisition means to perform an acquisition process of new key information.

12. An authentication apparatus for supplying electronic key information to a resource, and for, when said key information is legitimate, making said resource available, said authentication apparatus having:

a memory having discernment information for identifying a user and key information to be supplied to a resource stored;

input means into which the discernment information of the user is input; and discernment information collation means for collating the discernment information input from said input means with the discernment information of the user stored in said memory, and for, in a case where it coincided, transmitting the stored key information to said resource.

13. The authentication apparatus according to claim 12, having:

means for transmitting the discernment information input from said input means to the management apparatus for managing the discernment information of the user; and discernment information storage means for, in a case where the result that said discernment information input from said management apparatus coincided with the discernment information of the user stored in said management apparatus was obtained, for causing said memory to store said discernment information that was input.

14. The authentication apparatus according to claim 12, having:

means for collating the discernment information input from said input means with the discernment information of the user stored in said memory, and for, in a case where it coincided, transmitting this result to a management apparatus for managing the discernment information of the user; and key information acquisition means for, responding to said result, receiving the key information caused to correspond to the discernment information of the user from said management apparatus, and for causing said memory to store it.

15. The authentication apparatus according to claim 14, having means for monitoring a time limit of validity of the key information stored in said memory, and for, when the time limit of validity elapsed, causing said key information acquisition means to perform an acquisition process of new key information.

16. The authentication apparatus according to claim 12, wherein said discernment information is one of authentication information specific to a user and ID information, or authentication information specific to a user and ID information.

17. A management apparatus for managing discernment information of a user that is employed for an authentication apparatus for supplying electronic key information to a resource, and for, when said key information is legitimate, making said resource available, said management apparatus having:

a memory having discernment information of a user of a resource stored; and collation means for collating the discernment information to be transmitted from the authentication apparatus with the discernment information of the user stored in said memory to transmit a collation result.

18. The management apparatus according to claim 17, having:

a memory having the discernment information of a user of a resource and said key information of said resource stored correspondingly; and means for receiving a result to the effect that the discernment information of the user stored in said authentication apparatus coincides with the discernment information input into said authentication apparatus from said authentication apparatus, and for, responding to this result, retrieving the key information caused to correspond to said discernment information from said memory to transmit this key information to said authentication apparatus.

19. A computer program product, embodied in a computer readable medium, of an authentication apparatus for supplying electronic key information to a resource, and for, when said key information is legitimate, making said resource available, wherein said program product causes said authentication apparatus to function as means for retrieving discernment information that coincides with the discernment information, which was input, from a memory having discernment information stored for identifying a user and key information to be supplied to a resource, and for, in a case where the discernment information that coincides exists, transmitting the stored key information to said resource.

20. The computer program product, embodied in a computer readable medium, of the authentication apparatus according to claim 19, wherein said program causes said authentication apparatus to function as means for:

transmitting the discernment information that was input to a management apparatus for managing the discernment information of the user; and in a case where the result that said discernment information of said user input from said management apparatus coincided with the discernment information of the user stored in said management apparatus was obtained, causing the memory to store said discernment information that was input.

21. A computer program product, embodied in a computer readable medium, of a management apparatus for managing discernment information of a user to be employed for an authentication apparatus for supplying electronic key information to a resource, and for, when said key information is legitimate, making said resource available, wherein said program causes said management apparatus to function as means for collating the discernment information of a user of a resource stored in a memory with the discernment information transmitted from the authentication apparatus to transmit this collation,result.

22. The computer program product, embodied in a computer readable medium, of a management apparatus according to claim 21, wherein said program causes said management apparatus to function as means for receiving a result to the effect that the discernment information of the user stored in said authentication apparatus coincides with the discernment information input into said authentication apparatus from said authentication apparatus, and for, responding to this result, retrieving key information caused to correspond to said discernment information from the memory having the discernment information of the user of the resource and the key information of said resource stored correspondingly to transmit the retrieved key information.

23. A method of registering information for authenticating an electronic key information system to an authentication apparatus, said information registration method of the electronic key information system having the steps of:

in registering discernment information of a user to the authentication apparatus, transmitting the discernment information input into said authentication apparatus to a management apparatus for managing the discernment information;

in said management apparatus, collating the discernment information transmitted from said authentication apparatus with the pre-registered discernment information of the user, and for, in a case where it coincided, transmitting its collation result to said authentication apparatus; and in said authentication apparatus, receiving a collation result of coincidence from said management apparatus to register said discernment information that was input as discernment information for authenticating a user.

24. The information registration method of the electronic key information system according to claim 23, further having the steps of:

in registering key information of a resource to said authentication apparatus, inputting the discernment information input into said authentication apparatus;

collating said transmitted discernment information with the discernment information of the user stored in said authentication apparatus, and for, in a case where it coincided as a result of collation, transmitting said discernment information to said management apparatus;

retrieving the key information stored correspondingly to said transmitted discernment information to transmit this key information to said authentication apparatus; and registering said key information transmitted from said management apparatus to said authentication apparatus.

25. The information registration method of the electronic key information system according to claim 23, wherein said discernment information is one of authentication information specific to a user and ID information, or authentication information specific to a user and ID information.

26. The information registration method of the electronic key information system according to claim 25, wherein said information registration method of the electronic key information system monitors a time limit of validity of the key information stored in said authentication apparatus, and in a case where said time limit of validity of said key information elapsed, registers new key information to said authentication apparatus.

* * * * *